Feb. 10, 1970     W. H. ZINN     3,494,827
MECHANICAL DEVICE FOR QUICKLY DISCONNECTING DRIVE
MECHANISM FROM CONTROL ROD OF NUCLEAR REACTOR
Filed Oct. 10, 1967     3 Sheets-Sheet 1
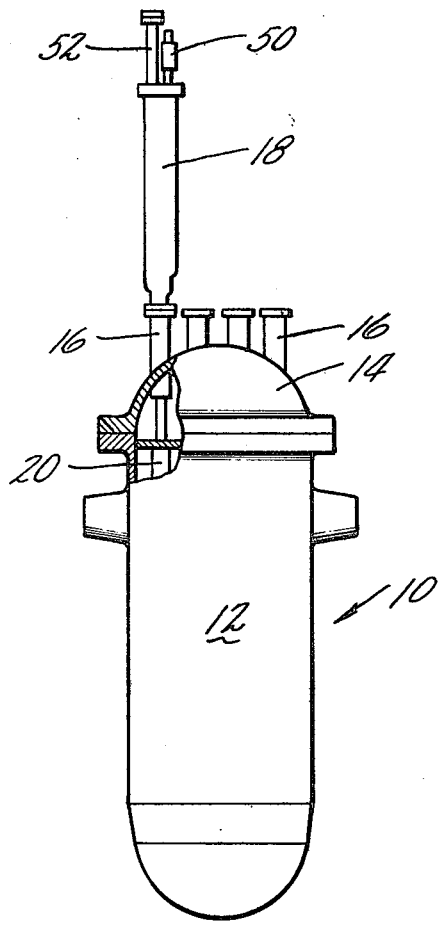
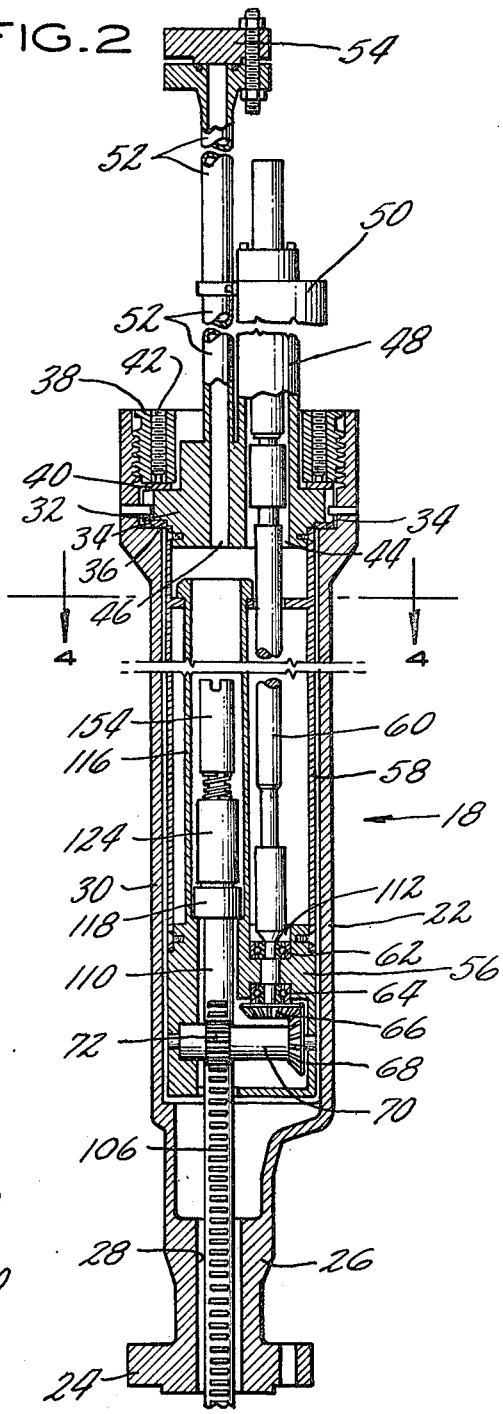
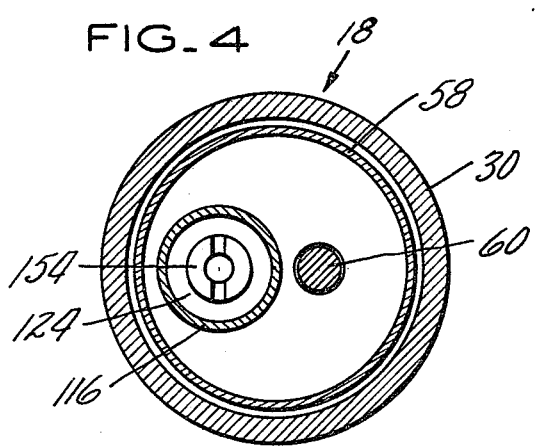
INVENTOR
WALTER H. ZINN
BY John F. Carney
ATTORNEY

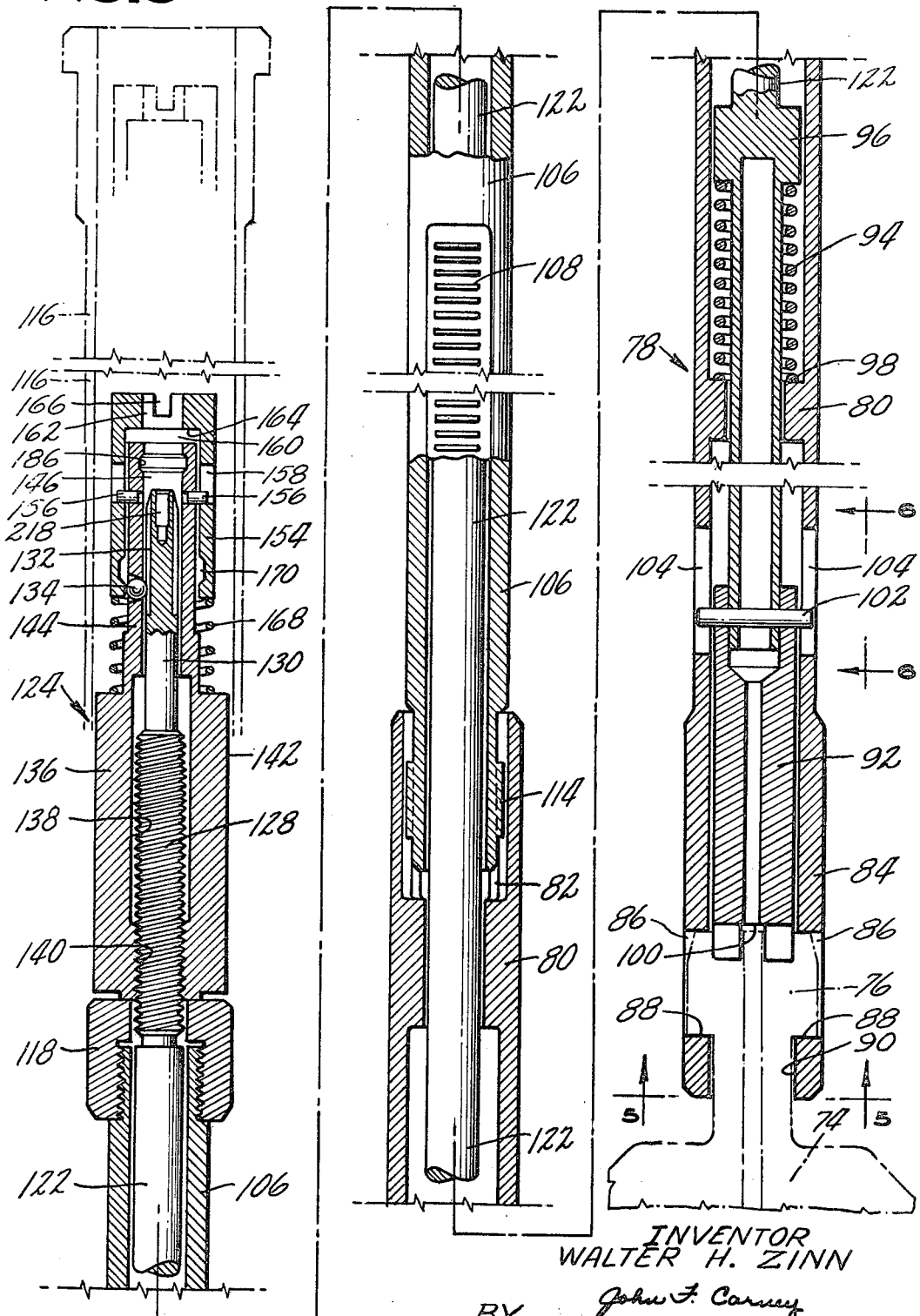

Feb. 10, 1970   W. H. ZINN   3,494,827
MECHANICAL DEVICE FOR QUICKLY DISCONNECTING DRIVE
MECHANISM FROM CONTROL ROD OF NUCLEAR REACTOR
Filed Oct. 10, 1967   3 Sheets-Sheet 3
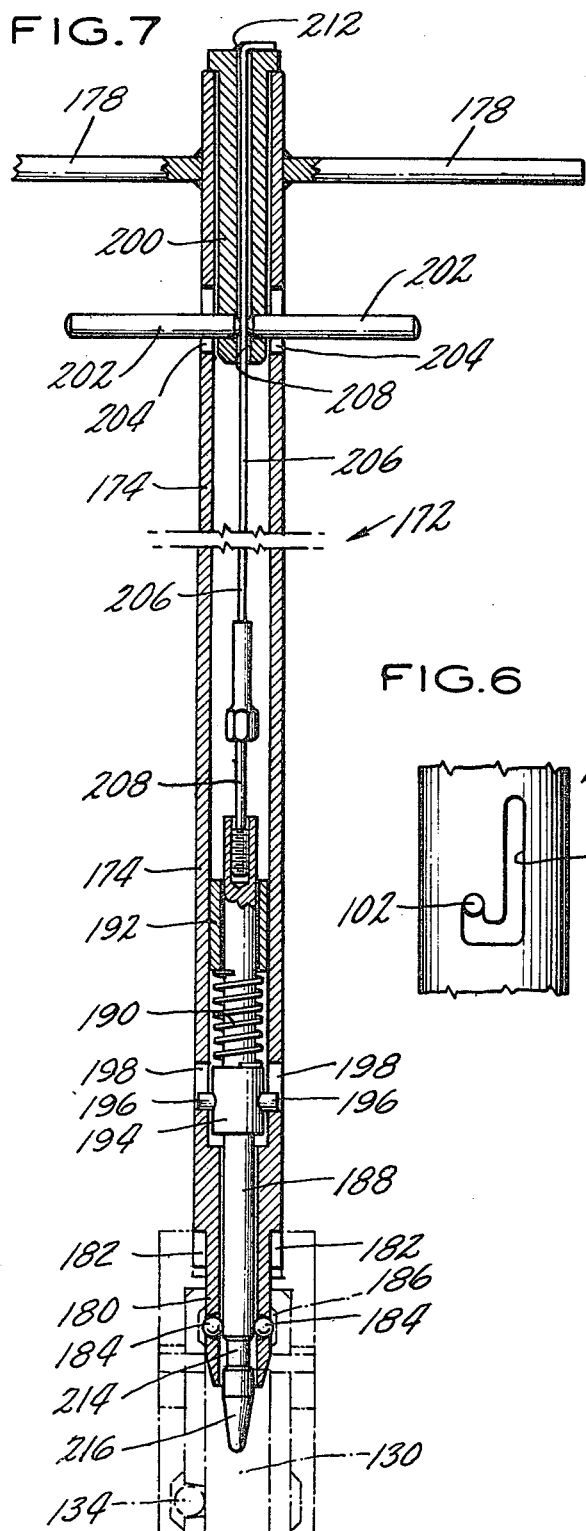
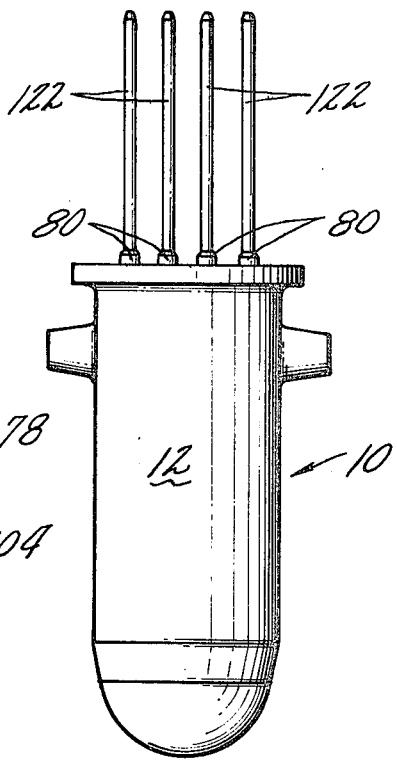
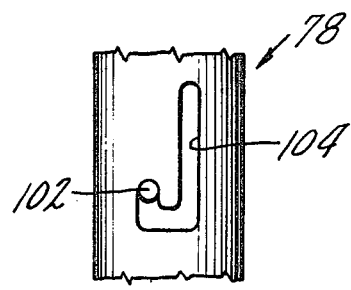
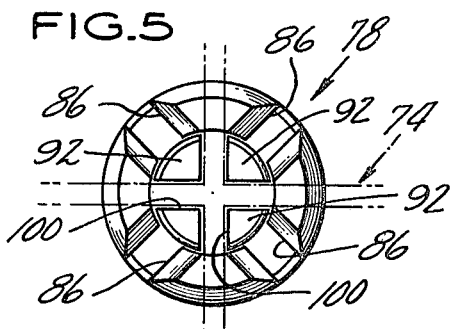
INVENTOR
WALTER H. ZINN
BY John F. Carney
ATTORNEY 3,494,827
MECHANICAL DEVICE FOR QUICKLY DISCON-
NECTING DRIVE MECHANISM FROM CONTROL
ROD OF NUCLEAR REACTOR
Walter H. Zinn, Glastonbury, Conn., assignor to Combustion Engineering, Inc., Windsor, Conn., a corporation of Delaware
Filed Oct. 10, 1967, Ser. No. 674,207
Int. Cl. G21c 7/08
U.S. Cl. 176—36       5 Claims

ABSTRACT OF THE DISCLOSURE

An apparatus for connecting, driving and disconnecting the control rods in a nuclear reactor employing a drive mechanism of the rack and pinion type. The motor and drive shaft that operate the pinion are eccentrically mounted on the apparatus housing in parallel but non-aligned relation to the axis of the rack. An access tube which communicates with the housing interior is mounted on the housing cover in axial alignment with the rack and the nut assembly that connects the rack to the control rod coupler assembly thereby facilitating disconnection of the control rod from the drive mechanism in order that the latter can be removed from the reactor vessel together with the mechanism housing in one operation.

Background of the invention

As is generally well known, in nuclear reactors adapted for use in the generation of electrical energy, several closely spaced control rods are employed to regulate the rate of reaction within the active portion or core of the reactor and also to terminate the operation of the reactor under normal operating conditions as well as during periods when there is danger of the reaction's "running away." The control rods are interspersed throughout the reactor core intermediate the fuel elements and function by absorbing neutrons from the fuel elements in relation to the effective position of the rods within the reactor core.

During the operation of nuclear reactors it periodically becomes necessary to remove the fuel elements from the core, such as for example for purposes of refueling or for maintenance. This requires the removal of the head of the reactor vessel together with the control rod drive mechanisms which are mounted thereon. After the vessel head has been removed the control element shrouds and core hold-down means must be removed to expose the fuel elements which can then be retracted from their positions within the reactor core. It is obvious that the reactor must be in the shutdown condition during periods when the fuel elements are to be removed and to maintain the reactor in this condition requires that the control rods remain fully inserted during the entire operation, Therefore, means must be provided for disconnecting the control rods from their associated drive mechanisms such that the latter can be removed with the vessel head.

Furthermore, due to the unavoidable congested arrangement of the component parts of a nuclear reactor, access to the coupling which connects each control rod to its associated drive mechanism is difficult. In the past, operation of the coupling required the sequential disconnection of several of the components of the drive mechanism and its housing and therefore resulted in a laborious and time-consuming operation. When it is considered that in nuclear reactors operable in electrical generating plants of high capacity the number of control rods employed oftentimes exceeds fifty in number, it can be seen that the time and effort required for reactor maintenance and refueling is indeed considerable.

Summary of the invention

The present invention is therefore directed to a control rod drive mechanism and connection assembly arranged to permit easy access to the control rod coupler for facilitating disassembly of the components in order that the reactor vessel head can be safely and conveniently removed to expose the fuel elements. This is accomplished in the present invention by providing a drive mechanism operable to drive an axially disposed rack, which drive mechanism is so located with respect to the rack as to permit free access from above to the coupling connection between the control rod and its associated drive mechanism. The control rods are each provided with an extension shaft which is concentrically disposed with respect to the rack and the threaded connector which connects the two is located uppermost of the control rod—rack assembly for free access thereto from above. An access opening aligned with the reactor is provided in the top of the pressure housing such that the control rod extension shaft and rack can be disconnected without first having to remove or otherwise disassemble the drive mechanism.

Description of the drawings

FIGURE 1 is an elevational view, partly in section, illustrating a nuclear reactor incorporating the present invention;

FIGURE 2 is a vertical section illustrating a control rod drive mechanism according to the invention;

FIGURE 3 is a vertical section illustrating the rack and control rod coupling assembly according to the invention;

FIGURE 4 is a plane section taken along line 4—4 of FIGURE 2;

FIGURE 5 is a lower end view of the control rod gripper.

FIGURE 6 is a partial side elevation illustrating a portion of the control rod gripper;

FIGURE 7 is a view in section illustrating a typical tool operative to disengage the rack from the control rod coupling assembly; and FIGURE 8 is an elevational view illustrating the nuclear reactor of FIGURE 1 with its vessel head removed.

Description of the preferred embodiment

Referring to FIGURE 1, there is shown a nuclear reactor 10 including a vertically arranged, cylindrical reactor vessel 12 having a generally hemispherical closure head 14. The closure head 14 attaches a plurality of upstanding nozzles 16 which communicate with the interior of the head and upon each of which is mounted a control rod drive assembly indicated as 18. In the drawing only one such drive assembly is shown. Control rod shrouds 20 are disposed within the reactor vessel and house an associated control rod (not shown in the figure) which is vertically movable into and out of the active portion or core of the reactor by means of the drive mechanism incorporated in the assembly 18.

FIGURE 2 illustrates a typical drive assembly 18 including the control rod drive mechanism in greater detail. As shown, the assembly comprises a pressure housing 22 which is adapted to be mounted upon the nozzle 16 by means of a flanged connection indicated as 24. Suitable seals (not shown) may be employed to render the connection fluid tight. The pressure housing 22 comprises an elongated, generally cylindrical lower portion 26 having a concentrically disposed opening 28. Atop the lower portion 26 and in eccentric relation therewith is a cylindrical housing body 30 which is adapted to contain a portion of the control rod drive mechanism as hereinafter described. The upper end of the housing body 30 is closed by means of a closure plug 32 which is seated upon a plug seat 34 provided in the housing body and sealed by means of a sealing gasket 36 or the like. The closure plug 32 is retained in seated relation within the housing body 30 by means of locking collar 38 threadedly received within the upper end of the pressure housing 22 and which operates in conjunction with an annular washer 40 and compression screws 42 to force the plug into sealed, seated engagement upon the plug seat. The closure plug 32 is further provided with a pair of spaced through-openings 44 and 46 that communicate with the interior of the pressure housing 22. The opening 44 communicates at its upper end with an upper housing body 48 which contains appropriate braking and clutching mechanism for operating the drive mechanism and which mounts on its top a drive motor 50 as shown in FIGURES 1 and 2. The upper end of the opening 46 communicates with the interior of an open-ended, elongated access tube 52 formed integral with the closure plug 32 and which is closed at its upper end by means of a flanged closure plate 54. It is preferable to position the upper end of the access tube 52 such that it is easily accessible to workmen from a catwalk or other staging structure (not shown) which generally overlies the reactor and by means of which maintenance and inspection of each of the drive mechanisms are permitted.

The interior of the pressure housing body 30 contains a gear housing 56 disposed in axially spaced relation to the closure plug 32 and supportedly connected thereto by means of a cylindrical support sleeve 58. A drive shaft 60 extends between the gear housing 56 and the braking and clutching mechanism contained in the upper housing body 48. The lower portion of the drive shaft 60 is rotatably secured within the gear housing 56 by means of appropriate roller bearing members 62 and 64. At the end of the drive shaft is attached a bevel gear 66 which drivingly operates a companion gear 68 mounted on a rotatably shaft 70. The shaft 70 is disposed at right angles to the drive shaft and mounts the pinion gear 72, the latter being operable to drive the control rod 74 into and out of position within the reactor core by means of a rack and pinion arrangement as hereinafter described.

The constructional details of the control rod 74, apart from the means for connecting it to the drive mechanism, are not a part of the disclosed invention and will not be described herein except to state that various constructions can be employed. In the described embodiment of the invention the control rod 74 possesses a head 76 that is cruciform in section and adapted for connection with a coupling mechanism indicated as 78. The coupling mechanism 78 comprises a elongated, cylindrical coupling tube 80 having a splined socket 82 at one end and a coupler head 84 at the other end. As shown in FIGURE 3, the coupler head is formed adjacent its leading end with a plurality of spaced, longitudinal slot openings 86 which are of a dimension to receive the elements of the cruciform control rod head 76. The lower end surfaces 88 of the slot openings 86 are adapted to engage mating surfaces on the elements of the head 84 when the control rod head is in connected relation with the coupler. The end of the coupler head is provided at 90 with a cruciform opening that permits insertion of the control rod head 76 into the coupler head until the former is aligned with the openings 86 whereupon relative rotation between the coupler and the control rod head will cause the lower end rod surfaces of the head 76 to seat on the surface 88.

Within the coupling tube 80, a reciprocal locking plunger 92 is operable to releaseably engage the top of the control rod head 76. A spring 94 operably engages the underside of the plunger head 96 and a spring stop 98 formed integral with the tube 80 and biases the plunger upwardly into its unlocked position. The lower end of the plunger 92 is formed with slots 100 disposed at right angles to form an opening adapted to lockingly engage the top of the control rod head after it has been inserted into the coupler head 84 and the plunger is urged against the action of the spring into locking engagement with the control rod head. As shown, the locking plunger 92 may be formed as a two-piece assembly that is connected together by a pin 102 whose ends extend into two diametrically opposed longitudinal slots 104 provided in the coupling tube 80, thereby preventing any relative rotational movement between the tube and the plunger. In this manner the slots 100 in the plunger head 96 can be maintained in alignment with the mating cruciform elements on the control rod head 76. The plunger is operated by depressing it against the force of a spring 94 by means of an extension shaft operator hereinafter described.

Superimposed upon the coupling tube 80 and forming an axial extension thereof is a rack sleeve 106 that is provided on its exterior surface with rack teeth 108 adapted to be drivingly engaged by the teeth on the pinion gear 72 and operable to impart linear motion to the assembly in response to the operation of the drive motor 50 in order to position the control rod 74 within the reactor core. The rack sleeve 106 is a hollow, cylindrical member which extends upwardly from the coupling tube 80 into the opening 28 in the lower portion 26 of the pressure housing 22 and through openings 110 and 112 in the gear housing 56. The lower end of the rack sleeve 106 is provided with a splined head 114 which is engageable with a splined socket 82 in the coupling tube 80. By means of this splined connection, relative rotational motion between the sleeve 106 and the coupling mechanism 78 is prevented. When, however, it is desired to disengage the drive mechanism from the control rod, this connection permits free axial withdrawal of the head 114 from the socket 82.

Axial movement of the rack sleeve 106 within the pressure housing 22 is guided by means of an elongated cylinder 116 which extends upwardly from the top of the gear housing 56. The upper end of the rack sleeve 106 is provided with a shouldered head 118 that cooperates with the inner surface of the cylinder 116 to guide the linear travel of the rack and coupler assembly. This head 118 also serves as a rack travel limit stop by its abutment with the bottom of the cylinder. In the preferred embodiment, the combined lengths of the rack sleeve 106, coupling mechanism 78 and the control rod 74 are such that the lower end of the control rod will clear the bottom of the reactor core by approximately 2" when the rod is in its fully inserted position with the head 118 abutting the stop surface at the bottom of the guide cylinder 116.

In order to effect axial positional movement of the control rod 74 and coupling mechanism 78 in response to operation of the drive motor 50 through the rack and pinion drive, the rack sleeve 106 is axially secured to the coupling tube 80 by means of a threaded connection between the extension shaft-plunger operator 122 and connector 124. The extension shaft 122 is formed integral at its lower end to the upper end of the locking plunger 92. The shaft extends upwardly through and beyond the rack sleeve 106 where screw threads 128 are provided to receive the connector 124. The threads 128 extend to a level somewhat below the shouldered head 118 such that the thread portion of the connector 124 will bottom on the head 118 and thereby securely fasten the shaft to the rack sleeve 106. The upper end of the extension shaft 122 is provided with an elongated stem 130 of somewhat reduced diameter having one or more longitudinal grooves 132 to receive a corresponding number of locking detents 134 carried by connector 124 for locking the latter to the extension shaft.

The connector 124 is in the form of a lock nut assembly including a nut body 136 having an axial bore 138 of a diameter to clear the threads 128 on the extension shaft 122. The lower end of the bore 138 is provided with built-up screw threads 140 which cooperate with the threads 128 for tensioning the nut assembly upon the extension shaft. The nut body 136 is formed with an outer surface 142 which, together with the rack sleeve head 118, cooperates with the inner surface of the guide cylinder 116 to guide the linear travel of the rack and coupler-control rod assembly. Atop the nut body 136 and formed integral therewith is a detent retainer 144 in the form of a cylindrical member having a bore 146 sized to be received by the extension shaft stem 130. The detent retainer 144 is formed with one or more circumferentially spaced tapered apertures 152 that open into the bore 146 and are adapted to retain the locking detents 134 which, in the preferred arrangement, are spherical balls. The detents 134 are forced into and out of locking engagement with the grooves 132 in the extension shaft stem 130 by means of a detent operator 154 that is depressably secured to the detent retainer 144 by means of connecting pins 156. Elongated slots 158 in the former receive the pins 156 and thereby permit limited axial movement of the operator. The detent operator 154 is a generally cylindrical member having a through-opening, one portion 160 of which is adapted for reception over the detent retainer 144 and another portion 162 is sized to permit passage of an operating tool while at the same time forming a shoulder 164 that limits movement of the operator on the retainer. The top of the detent operator 154 is castellated or otherwise slotted as at 166 for engagement of the aforementioned tool, whereby the connector assembly can be rotated as hereinafter described. A spring 168 extends between the top of the nut body 136 and the bottom of the detent operator 154 to bias the latter upwardly into its locking position. This action causes the detents 134, which are otherwise received in their retracted position within an annular groove 170 in the retainer operator to be urged into locking engagement with the longitudinal grooves 132 in the extension shaft stem 130 such that retrograde movement between the nut body 136 and the extension shaft 122 is prevented.

When it is desired to disengage the control rods 74 from their associated drive mechanisms such that the closure head 14 can be removed from the reactor vessel 12 in order to replace the reactor's fuel elements or otherwise service the interior of the reactor vessel, a tool such as that indicated at 172 in FIGURE 5 is employed to effect disconnection of the drive mechanism. The disclosed tool 172 comprises an outer, elongated, hollow, cylindrical sleeve 176 having laterally extending gripper arms 178. Adjacent its lower end the sleeve 176 is formed with a reduced diameter portion 180 sized to be inserted through the opening 162 provided in the detent operator 154. Adjacent the shoulder formed between the sleeve proper 176 and the reduced diameter portion 180 are provided a plurality of circumferentially spaced ribs 182 adapted to engage the slots 166 in the detent operator for rotating the connector. Ball detents 184 located at the lower end of the reduced diameter portion 180 are adapted to cooperate with an annular relief groove 186 in the detent 144 to lock the tool to the connector 124. These detents are operated by a plunger 188 that is biased into the locking position by means of a spring 190 that extends between shoulders provided by a cylindrical boss 192 attached to the inner surface of sleeve 176 and raised portion 194 on the plunger. Diametrically spaced pins 196 cooperate with longitudinal slots 198 in the sleeve 176 to prevent relative rotational movement between the plunger and the sleeve.

A plunger operator 200 in the form of a shouldered cylindrical member is slightly received within the upper end of the sleeve 176 and retained therein by means of grippers 202 that are received in slots 204. Manipulation of the plunger operator 200 through grippers 202 is effective to retract the plunger 188. The plunger and its operator are interconnected by means of a flexible cable 206 or the like which is threadedly attached at one end to the upper end of the plunger 200 by means of a cable connector 208 and as its other end to the operator 200 by passing it through a bore 210 provided in the latter and welding it to the top surface thereof as at 212. The arrangement is such that release of the grippers 202 will cause the plunger 188 to be extended under the force of the spring 190.

Disassembly of the reactor internals is accomplished as follows. Operation of the reactor is suspended by placing all of the control rods 74 in their fully extended position within the reactor core. In this position the lower ends of the reactors are located approximately two inches above the bottom of the core. Thereafter the closure plates 54 of the access tubes 52 are removed to expose the upper end of the connector 124 housed within the interior of each of the pressure housings 22. A workman then inserts the tool 172 into the pressure housing through the access tube 52 with the plunger 188 retracted forcing the grippers 202 on the plunger operator upwardly against the force of the spring 190. This action causes the ball detents 184 in the tool to be radially retracted into the relief groove 214 provided in the plunger 188. The leading end of the tool is inserted into the bore 162 of the detent operator 154 being guided therein by means of the pointed tip 216 on the plunger and the ribs 182 on the sleeve 176 are seated in the tool receiving slots 166. The grippers 202 on the plunger operator 200 are then released thereby causing the plunger 188 to be spring biased downwardly with its tip 216 entering a countersunk centering bore 218 in the upper end of the extension shaft stem 130 and the detents 184 are forced into the sleeve groove 186 in the detent retainer 144 to secure the tool to the connector. At the same time the detent operator 154 is depressed downwardly against the force of the spring 168 under the weight of the tool or by a downward force exerted by a workman. This causes the connector detents 134 to be retracted from their locking engagement in the longitudinal grooves 132 on the stem 130 into the detent sleeve groove 170 thereby permitting the connector 124 to be rotated relative to the extension shaft 122. Thereafter the tool 176 is rotated to first cause the extension shaft 122 together with the connected control rod 74 to be lowered until the lower end of the control rod bottoms on the lower surface of the reactor core and thereafter to retract the reactor 124 from threaded engagement with the extension shaft to the position indicated by the dotted lines in FIGURE 3. The grippers 202 on the tool 176 are then depressed thereby unlocking the tool from the reactor 124 and the tool is then withdrawn from the access tube 152 leaving the connector resting loosely on the extension shaft stem 130 within the guide cylinder 116.

Next, the drive motor 50 is operated to retract the rack sleeve 106 thereby disengaging its splined head 114 from the splined socket 82 in the coupling tube 80 to thus completely sever the connection between the drive mechanism and the control rod. Means may be employed to lock the motor such that the rack sleeve 106 will be retained in this retracted position. If desirable, an elongated tether or rod or the like (not shown) can be inserted through the access tube with its bottom resting in the countersunk centering bore 218 and its upper end extending above the open end of the access tube 52 in order to indicate that the threaded connector 124 has completely disengaged the rack 106 from the extension shaft 122. If the connection has not been completely broken the tether or rod will rise together with the extension shaft when the drive motor 50 is operated. If the connection has been severed upon operation of the drive motor, the tether together with the extension shaft will remain in place while the rack is retracted.

The process is repeated for each of the drive mechanisms after which the closure head 14 can be removed from the reactor vessel 12 with the pressure housings 22 still assembled to the head. This is accomplished by merely breaking the threaded connectors that secure the head to the vessel and lifting the former from the latter by appropriate lifting means. FIGURE 6 illustrates the reactor in this condition with the vessel head 114 together with the pressure housings and the associated drive mechanisms removed thus leaving the several extension shafts 122 protruding upwardly above the top of the reactor vessel 12. Should it be desired to also remove the coupling mechanism 78, the extension shafts 122 can be manipulated to break the connection between the coupling mechanism and the associated control rods 74. Since, however, this feature does not form part of the present invention, the operation is not described in detail.

By means of the invention, therefore, there is provided a relatively simple apparatus adapted to be operatively effective to drivingly position the several control rods of a nuclear reactor within the reactor core, yet at the same time provide a means that permits a rapid, relatively effortless disconnection of the drive mechanism from its associated control rod when such is desirable in order to gain access to the interior of the reactor vessel. Moreover, by means of the present invention there is provided apparatus that ensures the safe disconnection of the drive mechanisms from the control rods in that means are provided to ensure that the control rods remain fully inserted within the reactor core before the vessel head together with the drive mechanisms mounted therein can be removed.

It will be understod that various changes in the details, materials, and arrangements of parts which have been herein described and illustrated in order to explain the nature of the invention, may be made by those skilled in the art within the principle and scope of the invention as expressed in the appended claims.

What is claimed is:

1. A drive assembly for a nuclear reactor control rod comprising:
   (a) a pressure housing attached to a detachable closure head of a reactor vessel, said pressure housing including an opening for communication with the interior of said reactor vessel;
   (b) a control rod disposed in the interior of the reactor vessel and adapted for vertical movement therein;
   (c) a control rod drive motor;
   (d) means for imparting vertical movement to said control rod in response to the operation of said drive motor including:
      (i) gear transmission means contained within said pressure housing and operatively connected to said drive motor;
      (ii) a vertically elongated, hollow, cylindrical rack operated by said gear transmission extending through said pressure housing opening into said pressure vessel interior;
      (iii) an extension shaft connected at its lower end to said control rod, said shaft extending concentrically through said rack into the interior of said pressure housing;
      (iv) connector means disposed at the upper end of said rack and extension shaft for releaseably connecting the two;
   (e) and means forming an opening in the top of said pressure housing for providing access to said connector means for operating the same.

2. A drive assembly as recited in claim 1 wherein said connector means comprises screw threads provided on said extension shaft adjacent its upper end and a threaded nut member engaging said screw thread for securing said extension shaft to said rack.

3. A drive assembly as recited in claim 2 wherein said extension shaft includes a stem portion superposed upon the threaded portion thereof and wherein said threaded nut member comprises a generally cylindrical body containing a through bore, integral threads provided in said through bore for engaging the threaded portion of said extension shaft, and means for preventing retrograde movement of said nut upon said shaft including a detent retainer superposed upon and integral with said nut member, radially movable detent means operable in said detent retainer and cooperating with longitudinal grooves on said stem portion for preventing relative movement between said nut and said extension shaft and an axially depressable detent operator comprising a generally cylindrical member telescopically received upon said detent retainer and connected thereto by means of a pin connection, an annular groove for receiving said detent means in its retracted position and means forming a tool receiving slot at the upper end thereof adapted to receive a rotating tool.

4. A drive assembly as recited in claim 2 further including an elongated coupling means extending between the lower end of said rack and the upper end of said control rod, means for attaching said control rod to said coupling means, a splined head at the lower end of said rack engageable with a splined socket in the upper end of said coupling means for connecting the two against relative rotational movement, said extension shaft being operatively connected to said coupling means for operating the same whereby actuation of said control rod drive motor is operable to withdraw said rack from said coupling means upon disconnection of said threaded nut member.

5. A drive assembly as recited in claim 4 including a pair of laterally spaced openings in said pressure housing, a gear housing spaced from said pressure housing and having a pair of openings aligned with said pressure housing openings, said drive motor being exteriorally mounted to said pressure housing, a drive shaft connected to said drive motor extending through one set of aligned openings in said pressure housing and said gear housing, a rotatable shaft mounted in said gear housing, a pinion being mounted to said rotatable shaft in operative engagement with said rack and interengaging gear means mounted on said rotatable shaft and on said drive shaft for operatively connecting said rack to said drive shaft.

References Cited

UNITED STATES PATENTS

| | | | |
|---|---|---|---|
| 3,079,323 | 2/1963 | Hawke | 176—36 |
| 3,089,839 | 5/1963 | Hawke et al. | 176—36 |
| 3,321,373 | 5/1967 | Challender | 176—36 |

LELAND A. SEBASTIAN, Primary Examiner

H. E. BEHREND, Assistant Examiner

U.S. Cl. X.R.

74—422